US006959194B2

(12) United States Patent
Brouwer et al.

(10) Patent No.: US 6,959,194 B2
(45) Date of Patent: Oct. 25, 2005

(54) SMS-MESSAGING

(75) Inventors: Sander Martijn Brouwer, Gorinchem (NL); William Herschel Dudley, Addison, TX (US)

(73) Assignee: CMG International B.V., Nieuwegein (NL)

( * ) Notice: Subject to any disclaimer, the term of this patent is extended or adjusted under 35 U.S.C. 154(b) by 0 days.

(21) Appl. No.: 10/235,611

(22) Filed: Sep. 4, 2002

(65) Prior Publication Data

US 2004/0043777 A1 Mar. 4, 2004

(51) Int. Cl.[7] .................................................. H04Q 7/20
(52) U.S. Cl. .................... 455/466; 455/412.1; 455/445; 370/351; 370/328
(58) Field of Search ............................... 455/466, 412, 455/412.1, 414, 422, 428–459, 550, 575, 403, 414.1, 412.2, 422.1, 575.1, 550.1; 370/351, 328, 331, 405, 401, 337, 347, 349, 410, 310, 352, 230, 356, 464, 387, 385, 338, 329, 465; 379/114, 219, 465

(56) References Cited

U.S. PATENT DOCUMENTS

| | | | | |
|---|---|---|---|---|
| 5,896,369 A | * | 4/1999 | Warsta et al. ................ 370/338 |
| 5,946,629 A | * | 8/1999 | Sawyer et al. ............... 455/466 |
| 6,085,100 A | * | 7/2000 | Tarnanen ...................... 455/466 |
| 6,108,559 A | * | 8/2000 | Astrom et al. ............... 455/466 |
| 6,292,669 B1 | * | 9/2001 | Meuronen et al. .......... 455/466 |
| 6,507,589 B1 | * | 1/2003 | Ramasubramani et al. . 370/465 |
| 2002/0110112 A1 | * | 8/2002 | Tuomi ......................... 370/352 |
| 2002/0167943 A1 | * | 11/2002 | Hakim et al. ................ 370/356 |

* cited by examiner

Primary Examiner—Edward F. Urban
Assistant Examiner—Charles Chow
(74) Attorney, Agent, or Firm—Michaelson & Associates; Peter L. Michaelson; Janet M. Skafar

(57) ABSTRACT

A system for routing SMS-messages to a plurality of short message service centers, comprising: a first transceiver for sending and receiving SMS-messages over a fixed network; a router table for identifying from a recipient address of a SMS-message a short message service center that services the intended recipient of the SMS-message, said first transceiver cooperating with the router table in order to submit a received SMS-message to an identified short message service center servicing the intended recipient. The system further comprises a GSM-node comprising a second transceiver for sending and receiving SMS-messages to and from a GSM-network, said second transceiver connected to said first transceiver; wherein said first transceiver and said GSM-node are connected and wherein said first transceiver is adapted to submit a SMS-message to said GSM-node when the short message is of a predetermined format, so that the GSM-node forms a proxy connected to the GSM-network.

14 Claims, 4 Drawing Sheets

SMS-MESSAGING

BACKGROUND OF THE INVENTION

1. Field of the Invention

The invention relates to a method and system for routing short messages (SMS-messages) to a plurality of short message service centers. Specifically, the invention relates to a system comprising a first transceiver for sending and receiving SMS-messages over a fixed network; and a router table for identifying from a recipient address of a SMS-message a short message service center that services the intended recipient of the SMS-message, said first transceiver cooperating with the router table in order to submit a received SMS-message to an identified short message service center servicing the intended recipient.

2. Description of the Related Art

Such a router system, shortly called an Inter-SMS-SC router is known to be used where providers exploiting radio networks that use different technologies, such as GSM, TDMA (Time Division Multiple Access) and CDMA (Code Division Multiple Access) aim to provide an interconnection service for the transmission of SMS-messages between these networks. Generally, each of these networks operates a Short Message Service—Service Center (SMS-SC, or shortly SMSC), which is a service that is able to provide delivery for SMS-messages inside the network. Because of the different cooperating technologies, it is useful to provide this transmission by a technology independent communications protocol such as the SMPP (Short Message Peer to Peer)-protocol over a TCP/IP-network.

If a SMS-message is received, the first transceiver identifies from a recipient address the SMS-SC that is able to deliver the message to the recipient. The router system is connected to a plurality of SMS-SCs in a network and is able to route the SMS-message to the appropriate SMS-SC. The receiving SMS-SC further handles the message according to it's own specific protocols and technology, which can be any technology such as a GSM, CDMA, TDMA or IDEN network.

Although the router, operating through such a communications protocol offers connectivity for routing SMS-messages between providers, the system falls short when a user tries to connect to a subscriber who is subscribed to a provider for which the router provides no interconnection.

The router identifies a recipient address from a SMS-message and uses the router tables to determine a short message service center that services the intended recipient of the SMS-message. Hence, by using the router tables, the router operates through a predetermined numbering scheme through which the router is able to identify the SMS-SC for which a SMS-message is destined. If this identification is positive, the router is able to rout the message to said specific SMS-service centre.

If a user tries to connect to a service that is not interconnected, the system is unable to relay the SMS-message, which therefore cannot be sent. This problem arises for instance when an American user tries to send a short message to a European user or vice versa since the router does not provide interconnection with the numerous European providers.

SUMMARY OF THE INVENTION

The invention aims to overcome above mentioned problem and aims to provide a fully two-way SMS connection between major international carriers, specifically between US carriers and carriers from outside the United States.

In accordance with the invention, the above goals are reached by a system as described in the preamble, the system further comprising a GSM-node comprising a second transceiver for sending and receiving SMS-messages to and from a GSM-network, said second transceiver connected to said first transceiver; wherein said first transceiver is adapted to submit a SMS-message to said GSM-node when the short message is of a predetermined format, so that the GSM-node forms a proxy connected to the GSM-network.

It is remarked that such a GSM-node is known per se from WO00/47004. However, in this publication, the GSM-node is used to interconnect the message service centres from two radio networks that operate using the same GSM-technology.

The invention further provides an inventive router featured according to the characteristics of claim 4–6 and a GSM-node characterized by the features of claim 12–14. Further, the invention provides a modified short message service center, as claimed in claim 13. By a router system according to the invention a connection is provided with the GSM world, thereby providing access for American users to a large part of the non-US world. In the inventive system the GSM-node is used as a proxy for connecting subscribers of various carriers in the GSM-world to the router that connects the short message service centres over a non-GSM network. Thus, if a European user sends a SMS-message to an American subscriber, instead of routing the message directly to an American carrier (where because of differing formats the message would not be handled), the message is routed to the inventive GSM-node, which then submits the message to the router that is able to select the correct SMS-service centre that is able to deliver the message to the American subscriber.

Vice versa, a subscriber in a non-GSM network (for instance: an American TDMA network) is able, using the routing system according to the invention, to communicate with a GSM-user via the inventive proxy that acts as a switching node in the GSM-network. The router recognizes that a chosen destination address is outside the numbering scheme for connecting the SMSCs. The router then routes the message to the proxy-GSM-node, which relays the message to the destined recipient using conventional GSM signalling.

In the preceding the invention has been described by means of a GSM-proxy connected to an inter SMSC-router, thereby offering access of multiple short message service centres to the GSM-world. For cases where it is not necessary to connect multiple service centres, an interconnection between a non-GSM network, such as a CDMA or TDMA radionetwork and the GSM-network is provided by a proxy configured according to the features of claim 7.

BRIEF DESCRIPTION OF THE DRAWINGS

The invention will further be elucidated with reference to the accompanying drawings, which are not intended to be limiting for the scope of the invention. It will be clear to the skilled person that many variations and alterations are possible without leaving the scope of the invention. In the drawings.

DETAILED DESCRIPTION OF THE PREFERRED EMBODIMENTS

Figure 1:
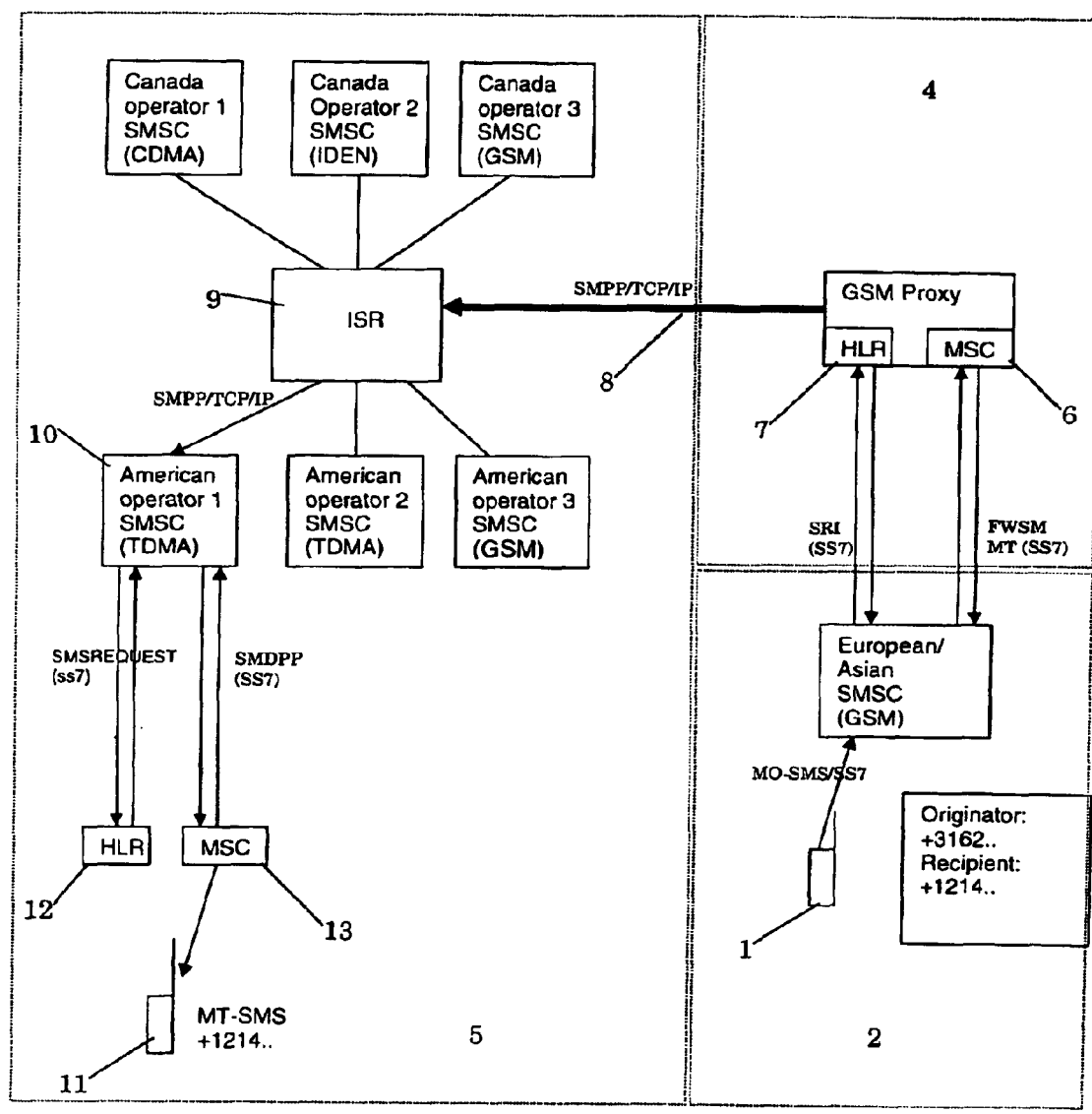
FIG. 1 shows a schematic configuration of a router system according to the invention, wherein a SMS-message is sent to a subcriber interconnected to the router.

FIG. 1 shows how a short message originating from a European mobile GSM user 1 located in the GSM-connected world, generally indicated by box 2 is sent by conventional GSM-signalling to the SMS-SC service centre 3 the user 1 is subscribed to. The SMS-SC 3 identifies the recipient address of the SMS-message and recognizes that it has a numbering scheme of a predetermined format, specifically, that the destination number is an US-telephone number. Instead of routing the SMS-message directly to a US-carrier, SMS-SC 3 routes the message to GSM-node 4. Additionally and optionally, the operator of the SMS-SC charges the subscriber for the message sent to the US at international tariff. As is apparent from FIG. 1, the GSM-node 4 acts as a proxy for the US-world, generally identified by box 5. The GSM-node 4 has an interface such that the GSM-world 2 recognizes the node as a Mobile services Switching Centre 6 (MSC). Such a MSC is described in GSM specification 09.02 and is known to the man skilled in the art. Thus, through conventional GSM-signalling, the home location register 7 (HLR) of the GSM-node is contacted to provide routing information for routing the SMS-message via said GSM-network to the GSM-node; the HLR 7 responds by sending routing information to the SMS-SC 3 and the message is then forwarded by a MAP (mobile application protocol) operation to the MSC 6 of the GSM-node 4.

The message is received by the GSM-node 4 and converted into a standard message protocol, such as SMPP (Short Message Peer to Peer protocol) or SMTP (Simple Mail Transfer Protocol). This service may be charged to the originating carrier network based on an interconnection tariff. The message is routed into a fixed network, such as a transatlantic high-speed data link 8 connecting the European and American continent. Thereby, the GSM-node 4 is connected to a router 9 which may be located on the American continent 5. Such a router 9 may be used by multiple cooperating US-carriers for providing interconnection between different technologies. The router 13 receives a standardized SMS-message, preferably by SMPP or SMTP. The router is able to identify a recipient address in the SMS-message and uses a router table for identifying from the recipient address a short message service center SMS-SC 10 that services the intended recipient of the SMS-message. The SMS-messages is then routed to the specifically identified SMS-SC 10. The destination network may be charged for such a routing service. The SMS-SC 10 in turn is able using its own technical standards (such as GSM, TDMA, CDMA, IDEN or another standard) to deliver the SMS-message to the intended recipient 11. In FIG. 1 this is represented for a carrier operating TDMA technology, that the SMS-SC 10 queries the HLR 12 of the subscriber, which in turn sends routing information so that the SMS-SC (10) is able to deliver the SMS-message to MSC 13 servicing the area the recipient 11 is located in. The destination network may charge the recipient for receiving the message, or deliver it for free if it decides to do so.

Figure 2:
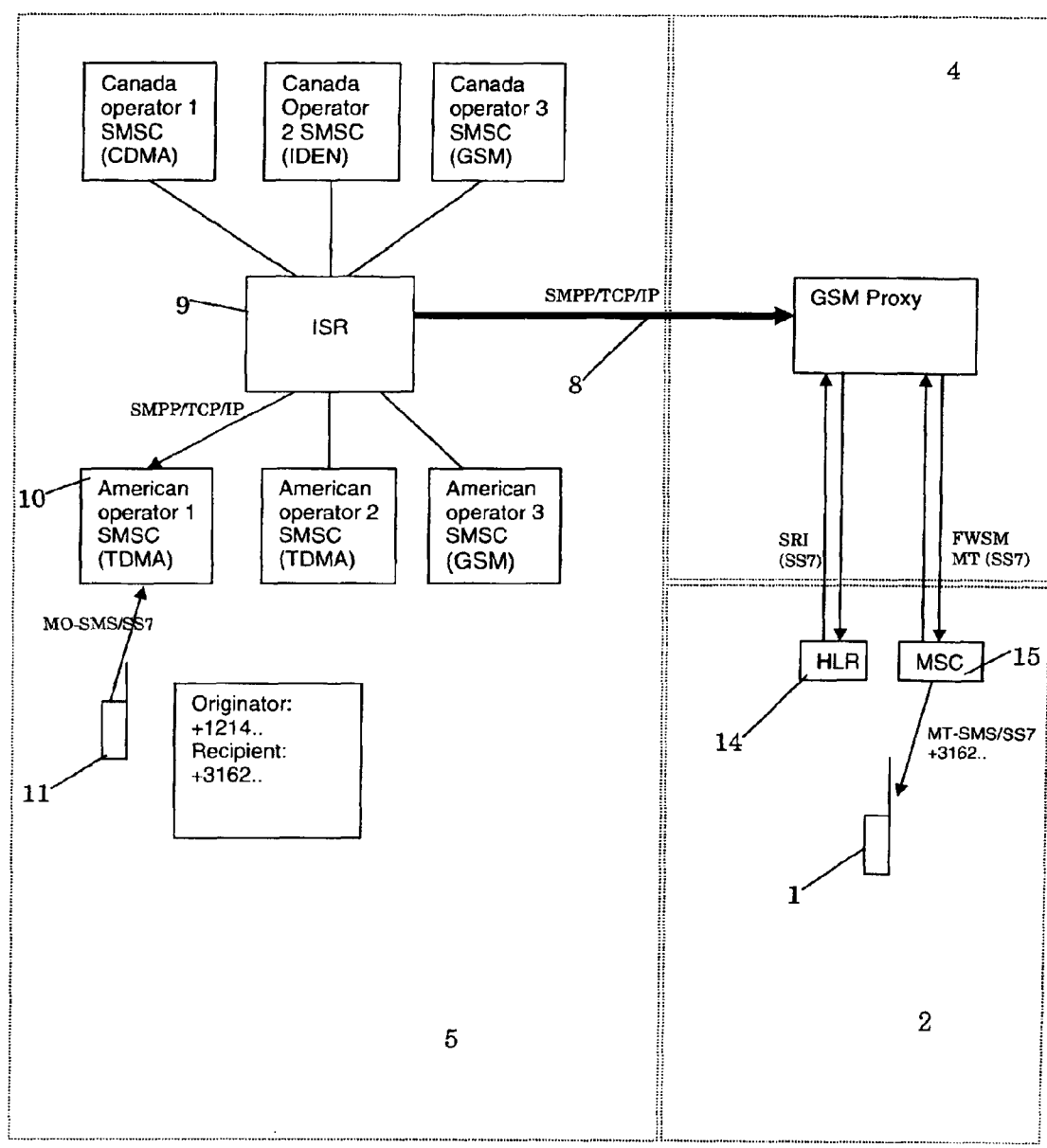
FIG. 2 shows a schematic configuration wherein the router system according to FIG. 1 transmits a message from the router to a subscriber located in the GSM-world.

The return route, illustrated in FIG. 2, depicts a SMS-message traveling from a US-subscriber 11 to a subscriber 1 who is located in the outside non-US GSM world 2. In FIG. 2, the same or corresponding elements are referenced by the same numerals as in FIG. 1. In this schematic illustration, subscriber 11 forwards a short message to a SMS-service center 10 he is subscribed to. The SMS-service center 10 reads the destination address of the intended recipient and submits the message to the router 8 via a fixed network by converting the SMS-message into a specified technology-independent format, such as the SMPP-protocol described earlier. The SMS-service center charges the subscriber at international tariff, indicated by the recipient address of the short message. The router receives the SMPP-message via a fixed network (for example, a TCP/IP-network). By consulting the router tables in router 8, the router recognizes that the recipient address is not serviceable inside the connected US-world. Instead of relaying the message to a connected SMS-service centre, the SMS message is transmitted to the proxy 4. For this relaying service, the originating network may be charged. The proxy 4, acting as a SMS-SC-node in GSM-network 2 receives the SMS-messages and contacts the home location register that is derived from the recipient address in the SMS-message. It may further charge the routing service, for relaying the message to the GSM-network. The home location register 14 responds and provides routing information for routing the SMS-message via the GSM-network to the MSC 15 that is servicing the area wherein the intended recipient is located. Therefore, an interconnection tariff may be charged. The intended recipient then receives the SMS-message on his mobile equipment, which is usually free of charge.

Figure 3:
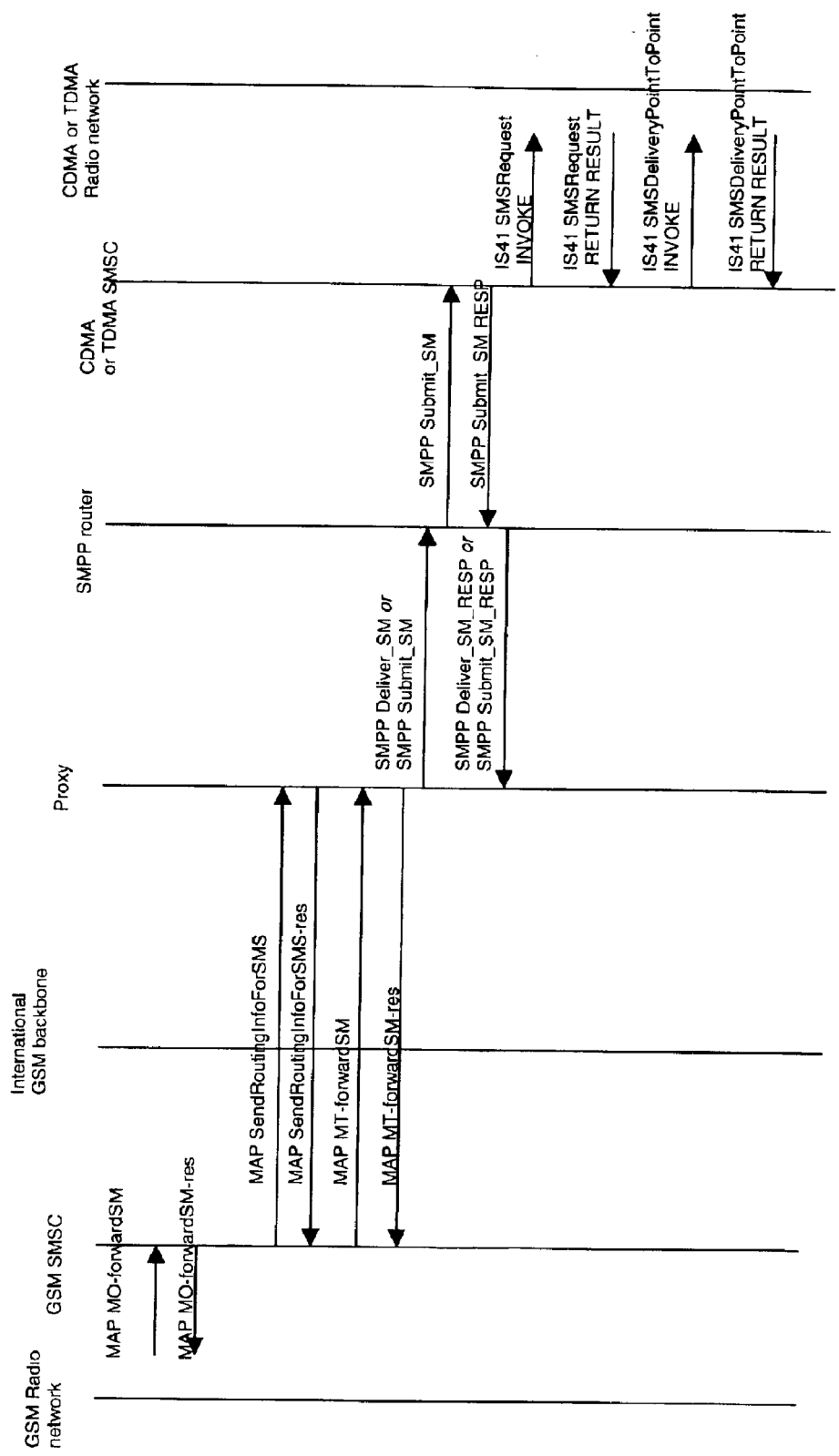
FIG. 3 shows a sequence diagram for sending a SMS-message from a GSM-subscriber located in a GSM-radio network to a user in a CDMA- or TDMA network, connected to a router according to the invention.

In FIG. 3, a sequence diagram is shown for the situation of a short message traveling from a GSM-network that is located in the outside "non-US" GSM-world, to a CDMA network, located, for instance in the USA. The same signalling scheme applies to the case wherein a recipient is subscribed to a TDMA network. According to FIG. 3, a GSM subscriber submits a short message to a CDMA/TDMA subscriber in a network in North, Latin or South America, for example to a CDMA subscriber in the U.S.A. The short message is received and acknowledged at the sender's home SMS-SC through standard GSM signalling for SMS, i.e. MAP MO-forwardSM primitive and MAP MO-forwardSM-res. The sender's home SMS-SC sends out a query to locate the American CDMA subscriber through the use of standard GSM signalling, i.e. MAP SendRoutingInfoForSMS. The International Gateway of the sender's home network is configured to route MAP SendRoutingInfoForSMS primitives destined to North American, Latin American or South American numbers to the Proxy. The Proxy receives the MAP SendRoutingInfoForSMS and validates whether the sending network is authorized to make use of the Proxy. If the sender's network is authorized to make use of the Proxy, the Proxy will return a MAP SendRoutingInfoForSMS response indicating the Proxy as the destination to receive the SMS. The sender's home SMS-SC will deliver the short message to the Proxy through standard GSM signaling, i.e. MAP MTforwardSM. The Proxy will forward the short message to the SMPP router through the means of the SMPP protocol (primitive SMPP Deliver_SM, SMPP Submit_SM or SMPP Data_SM). The SMPP router will route the short message to the home SMS-SC of the recipient. The recipient's home SMS-SC will deliver the short message to the recipient through standard IS41 signaling (primitives IS41 SMSRequest and IS41 SMSDeliveryPointToPoint).

Figure 4:
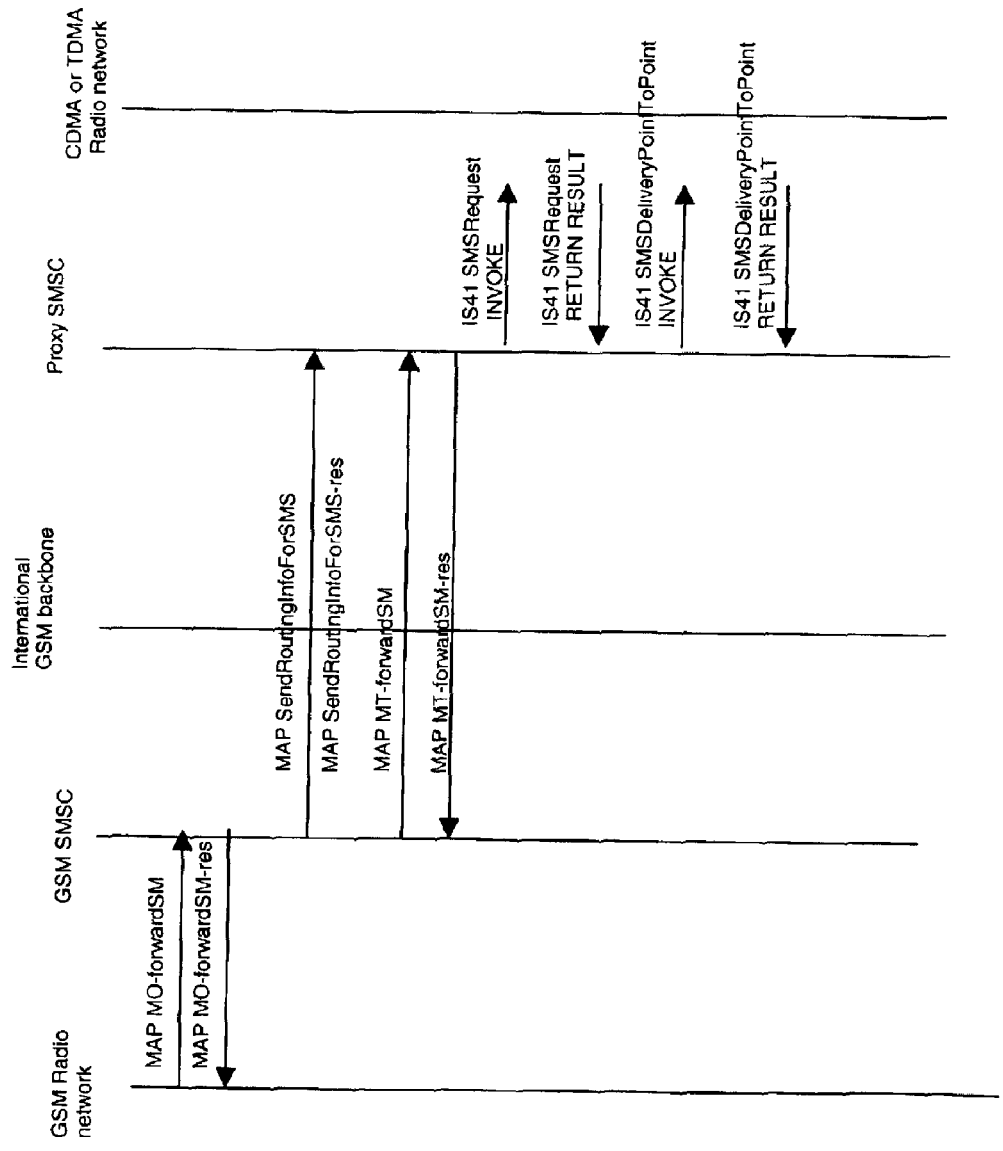
FIG. 4 shows a sequence diagram for sending a SMS-message from a GSM-subscriber located in a GSM-radio network directly to a user in a CDMA-network.

In the preceding the transfer of a SMS-message has been described from a sending mobile user to a receiving mobile user, via a router that interconnects a multiple of short message service centers via a fixed network. FIG. 4 shows a sequence diagram for the case a short message service center located in a CDMA or TDMA network is connected directly to a GSM-network. In this case, it is not necessary to provide a GSM-interconnection via the router but this can be achieved by a first receiver for receiving from a GSM-network a request for routing information for routing a SMS-message via said GSM-network to the GSM-node; a first transmitter for transmitting routing information to the GSM-network in order to receive said SMS-message; and a second receiver for receiving said SMS-message from said GSM-network, so as to form a proxy short message service centre connected to the GSM-network. According to FIG. 4, a GSM subscriber submits a short message to a CDMA subscriber in an environment where GSM is the dominant standard. The short message is received and acknowledged at the sender's home SMSC through standard GSM signalling for SMS, i.e. MAP MO-forwardSM primitive and MAP MO-forwardSM-res. The sender's home SMSC sends out a query to locate the CDMA subscriber through the use of standard GSM signalling, i.e. MAP SendRoutingInfo-ForSMS. The International Gateway of the sender's home network is configured to route MAP SendRoutingInfo-ForSMS primitives destined to the CDMA network to the Proxy SMSC. The Proxy SMSC receives the MAP SendRoutingInfoForSMS and validates whether the sending network is authorized to make use of the Proxy SMSC. If the sender's network is authorized to make use of the Proxy SMSC, the Proxy will return a MAP SendRoutingInfo-ForSMS response indicating the Proxy SMSC as the destination to receive the SMS. The sender's home SMSC will deliver the short message to the Proxy SMSC through standard GSM signaling, i.e. MAP MTforwardSM. The Proxy SMSC will deliver the short message to the CDMA recipient through standard IS41 signaling (primitives IS41 SMSRequest and IS41 SMSDeliveryPointToPoint).

The invention has been described above with reference to the transmission and reception of short messages between a GSM-telecommunication network and a network wherein at least a non-GSM standard is operated. Although the examples that are described relate to CDMA networks and TDMA networks, different networks, such as IDEN, UMTS, 3G (third generation), GPRS networks or even fixed-line networks, such as the Public Switched Telephone network can be accessed in a similar way. The claims of the invention are therefore not limited to the above mentioned non-GSM-networks.

What is claimed is:

1. A system for routing short messages (SMS-messages) to a plurality of short message service centers, at least one of which is implemented by a non-GSM technology, the system comprising:

a first transceiver for sending and receiving SMS-messages over a fixed network between a plurality of short message service centers, at least one of which being operated by a non-GSM technology;

a router table for identifying from a recipient address of a SMS-message a short message service center that services the intended recipient of the SMS-message, said first transceiver cooperating with the router table in order to submit a received SMS-message to an identified short message service center servicing the intended recipient; and a GSM-node comprising a second transceiver for sending and receiving SMS-messages to and from a GSM-network, said second transceiver connected to said first transceiver and further comprising:

a first receiver for receiving from a GSM-network a request for routing a SMS-message via said GSM-network to the GSM-node; and a first transmitter for transmitting said routing information to the GSM-network in order to receive said SMS-message;

wherein said first transceiver is adapted to submit a SMS-message to said GSM-node when the short message is of a predetermined format, so that the GSM-node forms a proxy connected to the GSM-network.

2. A system according to claim 1, wherein said first transceiver and said GSM-node are connected via a wide area network.

3. A system according to claim 2, wherein said wide area network comprises a trans-atlantic high-speed data link.

4. A router for providing connectivity between a plurality of short message service centers, at least one of which is implemented by a non-GSM technology, the router comprising:

a first transceiver for sending and receiving SMS-messages over a fixed network between a plurality of short message service centers, at least one of which being operated by a non-GSM technology;

a router table for identifying from a recipient address of a SMS-message a short message service center that services the intended recipient of the SMS-message, said first transceiver cooperating with the router table in order to submit a received SMS-message to an identified short message service center servicing the intended recipient;

wherein said first transceiver is adapted to send and receive SMS-messages to and from a GSM-node that is to be connected to said first transceiver, the GSM-node comprising a second transceiver for sending and receiving SMS-messages to and from a GSM-network and further comprising:

a first receiver for receiving from a GSM-network a request for routing information for routing a SMS-message via said GSM-network to the GSM-node; and a first transmitter for transmitting said routing information to the GSM-network in order to receive said SMS-message, wherein said first transceiver is adapted to submit a SMS-message to said GSM-node when the SMS-message is of a predetermined format, so that the GSM-node forms a proxy connected to the GSM-network.

5. A router according to claim 4, wherein said first transceiver is adapted to be connected to said GSM-node via a wide area network.

6. A router according to claim 5, wherein said wide area network comprises a trans-atlantic high-speed data link.

7. A short message service centre for receiving short messages and relaying short messages in a non-GSM radio network, the service centre comprising:

a GSM-node comprising a transceiver for sending and receiving SMS-messages to and from a GSM-network and further comprising:

a first receiver for receiving from a GSM-network a request for routing information for routing a SMS-message via said GSM-network to the GSM-node; and a first transmitter for transmitting said routing information to the GSM-network in order to receive said SMS-message; wherein said short message service centre and SMS-message; wherein said short message service centre and said GSM-node are connected and wherein said short message service centre is adapted to submit a SMS-message to said GSM-node when the SMS-message is of a predetermined format, so that the GSM-node forms a proxy connected to the GSM-network.

8. A short message service centre according to claim 7, wherein said short message service centre and said GSM-node are connected via a wide area network.

9. A short message service centre according to claim 8, wherein said wide area network comprises a trans-atlantic high-speed data link.

10. A GSM-node comprising:
   a first receiver for receiving from a GSM-network a request for routing information for routing a SMS-message via said GSM-network to the GSM-node;
   a first transmitter for transmitting routing information to the GSM-network in order to receive said SMS-message;
   a second receiver for receiving said SMS-message from said GSM-network;
   a second transmitter adapted to send a received SMS-message from said GSM-network to a router for providing connectivity between a plurality of short message service centers, at least one of which is implemented by a non-GSM technology, or to a short message service center for receiving short messages and relaying short messages in a non-GSM radio network, such as a TDMA or a CDMA radio network; and
   a gateway for relaying SMS-messages received from the router or the short message service center to the GSM-network.

11. A GSM-node according to claim 10, wherein said second transmitter is adapted to send a received SMS-message via a wide area network.

12. A GSM-node according to claim 11, wherein said wide area network comprises a trans-atlantic high-speed data link.

13. Method of routing a SMS-message to a recipient address, the method comprising the steps of:
   receiving a SMS-message from a GSM-node comprising:
      a first receiver for receiving from a GSM-network a request for routing information for routing said SMS-message via said GSM-network to the GSM-node;
      a first transmitter for transmitting routing information to the GSM-network in order to receive said SMS-message;
      a second receiver for receiving said SMS-message from said GSM-network;
      a second transmitter adapted to send a received SMS-message from said GSM-network to a router for providing connectivity between a plurality of short message service centers, at least one of which is implemented by a non-GSM technology, or to a short message service center for receiving short messages and relaying short messages in a non-GSM radio network; and
      a gateway for relaying SMS-messages received from the router or the short message service center to the GSM-network;
   providing a connection between said GSM-node and said router for providing connectivity between a plurality of short message service centers, at least one of which is implemented by a non-GSM technology;
   relaying said SMS-message to said router; and
   routing said message via said router to said recipient address.

14. Method of routing a SMS-message to a recipient address, the method comprising the steps of:
   receiving a SMS-message in a router for providing connectivity between a plurality of short message service centers, at least one of which is implemented by a non-GSM technology;
   providing a connection to a GSM-node comprising:
      a first receiver for receiving from a GSM-network a request for routing information for routing said SMS-message via said GSM-network to the GSM-node;
      a first transmitter for transmitting routing information to the GSM-network in order to receive said SMS-message;
      a second receiver for receiving said SMS-message from said-GSM-network;
      a second transmitter adapted to send a received SMS-message from said GSM-network to a router for providing connectivity between a plurality of short message service centers, at least one of which is implemented by a non-GSM technology, or to a short message service-center for receiving short messages and relaying short messages in a non-GSM radio network; and
      a gateway for relaying SMS-messages received from the router or the short message service center to the GSM-network;
   submitting said SMS-message to said GSM-node when the SMS-message is of a predetermined format, so that the GSM-node forms a proxy connected to the GSM-network; and
   delivering said message to the recipient address.

* * * * *